US009016022B2

(12) United States Patent
Oliphant

(10) Patent No.: US 9,016,022 B2
(45) Date of Patent: Apr. 28, 2015

(54) SUPPORT APPARATUS FOR SUPPORTING UTILITY CABLES AND UTILITY TRANSMISSION LINE INCLUDING SAME

(75) Inventor: Wesley J. Oliphant, Tomball, TX (US)

(73) Assignee: Trinity Industries Inc., Dallas, TX (US)

( * ) Notice: Subject to any disclaimer, the term of this patent is extended or adjusted under 35 U.S.C. 154(b) by 580 days.

(21) Appl. No.: 13/025,679

(22) Filed: Feb. 11, 2011

(65) Prior Publication Data

US 2012/0205502 A1   Aug. 16, 2012

(51) Int. Cl.
*E04H 12/00* (2006.01)
*E04H 12/24* (2006.01)
*E04H 12/10* (2006.01)

(52) U.S. Cl.
CPC ............. *E04H 12/24* (2013.01); *E04H 12/10* (2013.01)

(58) Field of Classification Search
CPC ......... E04H 12/00; E04H 12/04; E04H 12/08; E04H 12/085; E04H 12/10; E04H 12/16; E04H 12/24
USPC .............. 52/223.1, 223.4, 223.5, 40, 697, 52/651.02, 745.19; 248/219.2, 219.3
See application file for complete search history.

(56) References Cited

U.S. PATENT DOCUMENTS

| | | | | |
|---|---|---|---|---|
| 689,387 A | * | 12/1901 | Crossland | ........................ 52/848 |
| 3,299,586 A | * | 1/1967 | Hockaday | ......................... 52/40 |
| 3,343,315 A | * | 9/1967 | Marsh | .............................. 52/148 |
| 3,445,582 A | * | 5/1969 | Ghio, Jr et al. | .................. 174/43 |
| 3,469,343 A | * | 9/1969 | Johnson et al. | .................... 47/46 |
| 3,571,991 A | * | 3/1971 | Doocy et al. | ....................... 52/40 |
| 3,603,717 A | * | 9/1971 | Scott | ........................... 174/45 R |
| 3,649,740 A | * | 3/1972 | Boyer et al. | .................... 174/43 |
| 3,827,197 A | * | 8/1974 | Adam | ............................... 52/29 |
| 3,987,593 A | * | 10/1976 | Svensson | .......................... 52/98 |
| 4,166,347 A | * | 9/1979 | Pohlman et al. | ............. 52/223.4 |
| 4,194,080 A | * | 3/1980 | Meisberger | ................. 174/45 R |
| 4,615,154 A | * | 10/1986 | Troutner | .......................... 52/40 |
| 4,932,623 A | * | 6/1990 | Reisdorff | ................... 248/219.3 |
| 5,761,875 A | * | 6/1998 | Oliphant et al. | ............. 52/649.4 |
| 5,784,851 A | * | 7/1998 | Waugh | ............................ 52/848 |
| 6,367,226 B1 | * | 4/2002 | Shauf et al. | .................. 52/309.4 |
| 6,453,636 B1 | * | 9/2002 | Ritz | ................................ 52/835 |
| 6,705,058 B1 | * | 3/2004 | Foust et al. | ...................... 52/296 |
| 6,851,231 B2 | * | 2/2005 | Tadros et al. | ................ 52/223.4 |
| 6,938,392 B2 | * | 9/2005 | Fouad et al. | .................... 52/834 |
| 7,007,438 B1 | * | 3/2006 | Shields et al. | ............. 52/745.19 |
| 7,240,464 B2 | * | 7/2007 | Oliphant et al. | ............. 52/649.4 |
| 7,343,718 B2 | * | 3/2008 | Foust et al. | ................. 52/745.17 |
| 8,127,436 B2 | * | 3/2012 | Sauschuck et al. | ............. 29/760 |
| 2004/0211148 A1 | * | 10/2004 | Foust et al. | .................. 52/720.1 |
| 2006/0086060 A1 | * | 4/2006 | Oliphant et al. | ............. 52/736.2 |

* cited by examiner

*Primary Examiner* — William Gilbert
*Assistant Examiner* — James Ference
(74) *Attorney, Agent, or Firm* — Michael G. Smith; Jeffrey D. Hunt

(57) ABSTRACT

Embodiments provide apparatus for supporting at least one utility cable for spanning above ground, the apparatus comprising a centrifugally cast prestressed concrete pole, a structural adapter, and a cable support structure including an open lattice frame.

21 Claims, 4 Drawing Sheets

SUPPORT APPARATUS FOR SUPPORTING UTILITY CABLES AND UTILITY TRANSMISSION LINE INCLUDING SAME

FIELD OF INVENTION

The disclosure relates to support apparatus for supporting utility cables, and to utility transmission lines including the same.

BACKGROUND OF INVENTION

Elevated utility transmission lines such as, for example, elevated electric utility transmission lines, include one or more utility cables extending in a continuous manner along a route to transmit or carry utility service. The utility cables are supported above ground at designated heights that provide clearance over terrain features and obstacles, such as structures, along the route. Elevated utility transmission lines include a series of supports, such as elongated utility poles, spaced along the route to support the utility cables. The supports are spaced apart, and the utility cables span between the supports.

For reasons stated below, and for other reasons which will be apparent to those skilled in the art upon reading the present specification, there is a need in the art for improved support apparatus for supporting utility cables, and for improved utility transmission lines including the same.

BRIEF DESCRIPTION OF INVENTION

Embodiments provide improved support apparatus for supporting utility cables. Embodiments provide improved utility transmission lines including the same. Various shortcomings, disadvantages and problems of utility transmission lines and supports for the same are addressed herein, as will be understood by reading and studying the following specification.

DETAILED DESCRIPTION OF EMBODIMENTS

In the following detailed description, reference is made to the accompanying drawings that form a part hereof, and in which is shown by way of illustration specific embodiments which can be practiced. The embodiments are described in sufficient detail to enable those skilled in the art to practice the embodiments, and it is to be understood that other embodiments can be utilized and that logical, mechanical and other changes can be made without departing from the scope of embodiments. The following detailed description is, therefore, not to be taken in a limiting sense.

Figure 1:
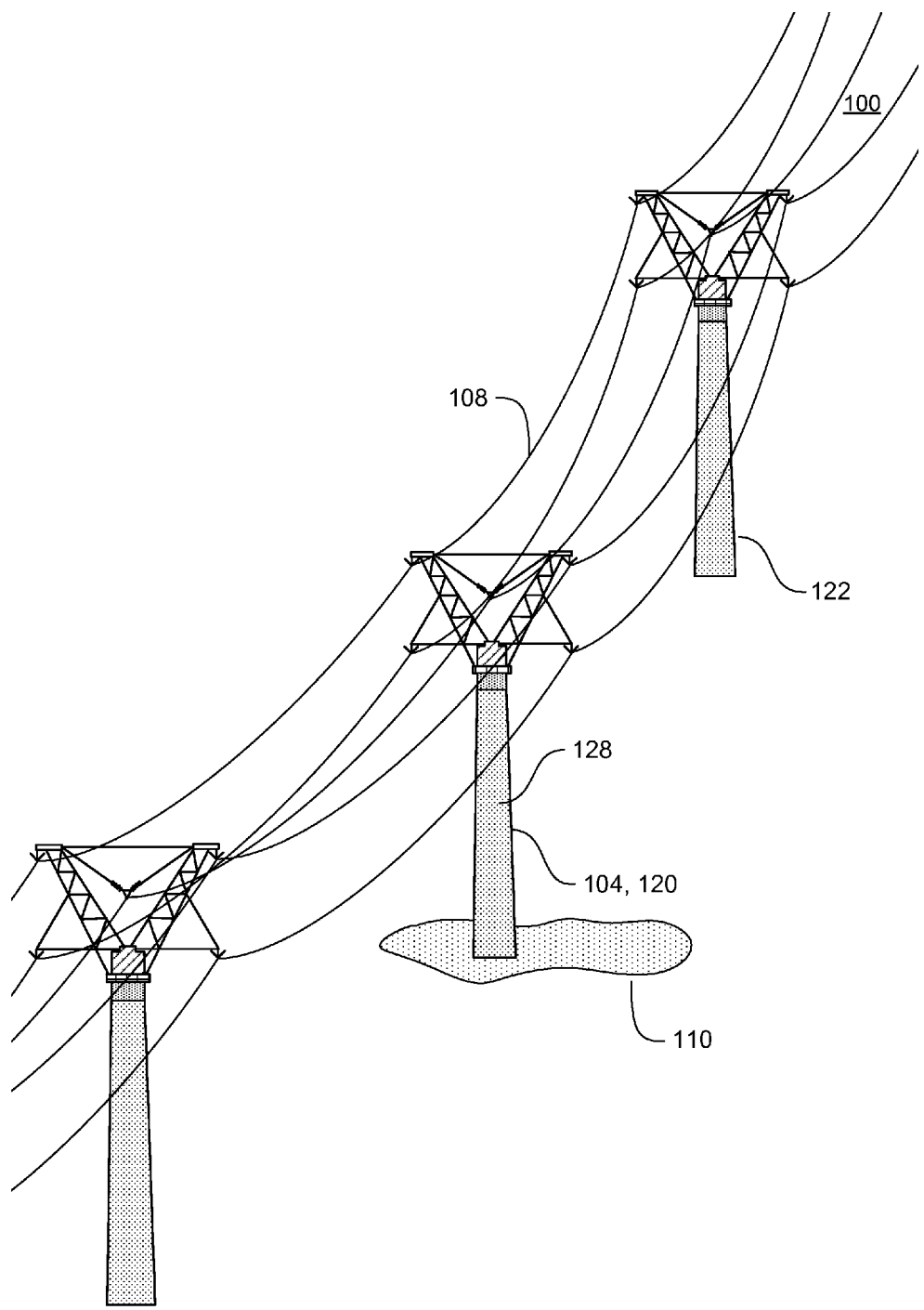
FIG. 1 is a partial perspective view of a utility transmission line including support apparatus for supporting utility cables, according to an embodiment.

FIG. 1 is a perspective view of an embodiment of a utility transmission line 100 including a plurality or series of spaced supports 104 supporting a plurality of utility cables 108 strung in a continuous manner along a route to transmit or carry utility service, wherein the plurality of supports 104 includes a plurality of support apparatus 120 for supporting utility cables 108 (apparatus 120 hereinafter being referenced as "support apparatus 120"). One specific example and embodiment of a utility transmission line 100 illustrated in FIG. 1 is an electric utility transmission line 100 having a plurality of utility cables 108, wherein the plurality of utility cables 108 includes, more specifically, five (5) electricity transmission utility cables 108 each having a nominal capacity of 500 kV and extending in parallel relation along the route. The utility cables 108 are strung and span between adjacent of the spaced supports 104 at heights providing necessary clearance above ground 110 along the route. As used herein, ground 100 includes terrain features and obstacles, such as structures, along the route. According to embodiments described in this disclosure, the series of supports 104 includes a plurality of support apparatus 120.

One of ordinary skill will understand that the series of supports 104 can include, in addition to a plurality of support apparatus 120 according to embodiments disclosed herein, different suitable types of supports (not shown) interspersed along the route among the plurality of support apparatus 120. Supports of different types that can be interspersed in the utility transmission line 100 can include, for example, common steel utility poles and common concrete utility poles. In the specific configuration illustrated in FIG. 1, utility transmission line 100 along the entire route thereof includes a series of support apparatus 120 according to embodiments of the present disclosure. One of ordinary skill will understand that the height and strength of each support apparatus 120 can be selected to satisfy multiple criteria and limitations along the route. Criteria for sizing support apparatus 120 can include but are not limited to, for example, providing necessary cable height at a particular point between adjacent supports, providing necessary spacing between adjacent supports to traverse terrain features, accommodating limitations on the positions available for siting support apparatus 120 along the right-of-way, accommodating limitations on the ground footprint of support apparatus 120, and other criteria, such as governmental restrictions on the configuration of utility transmission lines 100, that may apply at locations along the route.

Support apparatus 120 is configured to support at least one utility cable 108 spanning above the terrain along the route of the utility transmission line 100. In the specific embodiment shown in FIG. 1, support apparatus 120 is configured to support a plurality of utility cables 108 spanning along the route of the utility transmission line 100. Although each utility cable 108 can be of a different size and type, in the specific embodiment illustrated in FIG. 1, the series of support apparatus 120 is configured to support at designated heights above ground 110 five (5) identical utility cables 108 that, in the specific embodiment shown in FIG. 1, are identical 500 kV electricity transmission utility cables 108. One skilled in the art will appreciate that support apparatus 120 can be configured differently without departing from the scope of the present disclosure and embodiments. One skilled in the art will understand that support apparatus 120 is a specific embodiment of subject matter more broadly disclosed herein.

Referring again to FIG. 1, in the specific embodiment illustrated, support apparatus 120 supports five (5) utility cables 108 which span above ground 110 in elevated relation thereto between adjacent of the supports 120. It will be understood that, although the first and second adjacent supports 120 and 122 could differ according to type, in the specific embodiment shown in FIG. 1, each of the first and second adjacent supports 120 and 122 are of the same type as support apparatus 120, but have different heights and strengths to support the utility cables 108 spanning at different heights, over different span distances, at different relative support elevations, with different ground footprints, and facing in somewhat different directions along the route.

Referring to FIG. 1, support apparatus 120 includes a centrifugally cast concrete pole 128. One of ordinary skill will understand that concrete pole 128 is manufactured by use of suitable centrifugal molding equipment that is commercially available for manufacturing centrifugally cast prestressed concrete poles. One suitable supplier of suitable centrifugal molding equipment is, for example, PMW Industries of Ipoh, Malaysia. One of ordinary skill will understand that, in lieu of manufacturing concrete pole 128, concrete poles of various dimensions are available from various commercial suppliers. Valmont-Newmark, Inc. of Birmingham, Ala. is one commercial supplier of suitable concrete poles of various sizes. Returning to FIG. 1 concrete pole 128 has a bottom end portion 132 fixed to the ground 110 in a relationship wherein the supporting concrete pole 128 is fixed in a stationary position relative to the ground 110. In the specific embodiment illustrated in FIG. 1, bottom end portion 132 is directly fixed to the ground 110 by being received in a hole that is excavated in the ground and backfilled around the bottom end portion 132 to secure the concrete pole 128 in a substantially fixed, substantially vertical orientation. It will be understood that bottom end portion 132 can be fixed to the ground 110 in any suitable manner such as, for example, in an indirect manner such as by being affixed to a concrete foundation (not shown) constructed on the ground 110. The bottom end portion 132 being thus secured to the ground 110, whether directly or indirectly, defines a primary base 136 of support apparatus 120. It will be understood that primary base 136 performs the function of supporting support apparatus 120 in a stationary, upright orientation relative to the ground 110. The concrete pole 128 has an annular pole body 140 extending upwardly from the bottom end portion 132 along a pole central axis 144. The pole body 140 has a continuous outer wall 148 spaced from the pole central axis 144. It will be understood by those of ordinary skill that outer wall 148 is generally tubular and defines a void interior space 149 about pole central axis 144. The outer wall 148 is defined by centrifugally cast prestressed reinforced concrete 150 defining a respective continuous outer surface 152 thereof. Outer surface 152 is disposed in opposition to the void interior space 149 and thus defines a continuous outer surface of concrete pole 128. The concrete pole 128 has a top end portion 156 spaced from the bottom end portion 132. When the bottom end portion 132 is fixed to the ground 110, the top end portion 156 is spaced above ground 110 in elevated, fixed relation thereto. At the top end portion 156 the outer surface 152 has at least one dimensional characteristic 158 which is dimensioned to engage at least one compatible dimensional characteristic of a compatible structural adapter 162, wherein the structural adapter 162 has at least one compatible dimensional characteristic 166 that is compatible therewith. In the specific embodiment illustrated in FIG. 1, the at least one dimensional characteristic 158 is the top end portion 156 having a compatible tapering outside diameter configured for mating engagement with the structural adapter 160, wherein the structural adapter 162 has at least one compatible dimensional characteristic 166 which is a compatible tapering inside diameter. It will be understood that the top end portion 156 has a compatible tapering outside diameter for mating engagement in fixed relationship with the compatible tapering inside diameter of structural adapter 162 to support the structural adapter 162 in relation to the concrete pole 128. One of ordinary skill will understand that, in other specific embodiments (not shown), the top end portion 156 and structural adapter 162 each can have a compatible dimensional characteristic 166 that is a compatible, mating polygonal cross-sectional shape and size suitable for mating engagement along respective mating surfaces thereof. In one specific example (not shown), both have a dodecahedronal cross-sectional shape and are sized for mating engagement. The pole central axis 144 extends through pole body 140 in a longitudinal direction from the bottom end portion 132 to the top end portion 156. The substantially continuous outer wall 148 is spaced outwardly in a radial direction from the pole central axis 144. One of ordinary skill will understand that, in the specific embodiment illustrated in FIG. 1, outer wall 148 defines a series of hollow circular cross sections 171 of varying diameter, because concrete pole 128 is tapered such that the radius thereof increases from the top end portion 156 to the bottom end portion 132. It will be understood that the circular cross sections 171 are hollow because void interior space 149 is defined inside the outer wall 148.

Figure 3:
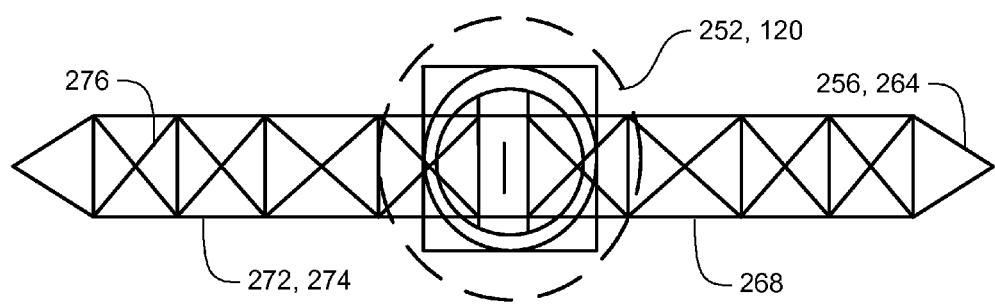
FIG. 3 is a partial top view of support apparatus for supporting utility cables, taken generally along 3-3 in FIG. 2.
Figure 4:
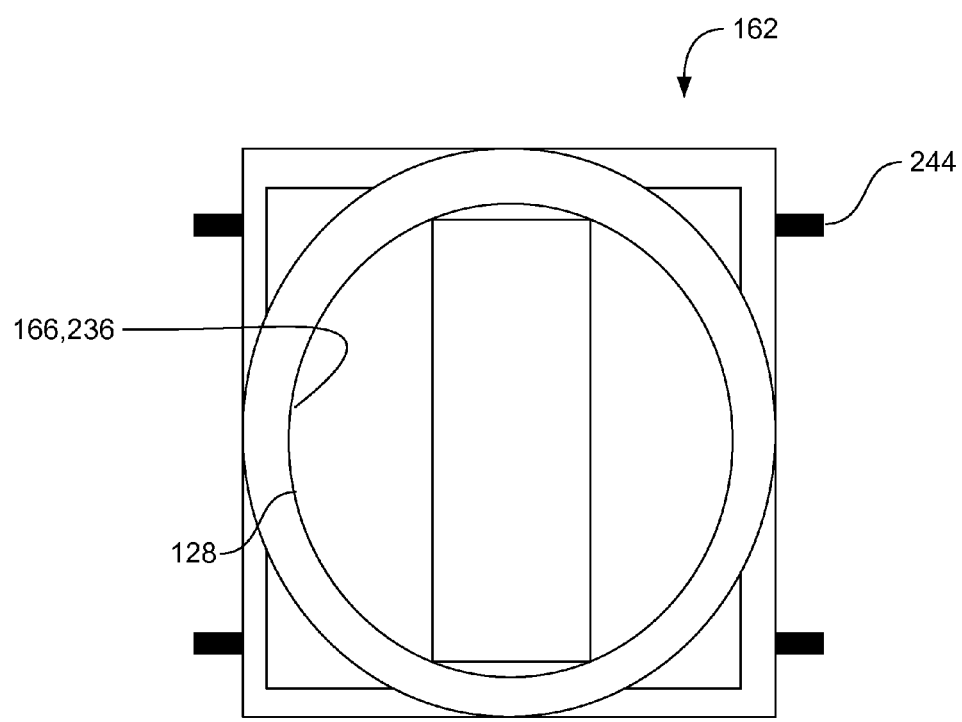
FIG. 4 is an enlarged partial top view of an area indicated in FIG. 3, showing a structural adapter.

Referring to FIG. 1, in the specific embodiment illustrated, support apparatus 120 includes structural adapter 162. Structural adapter 162 is configured for engagement in fixed structural relationship with the top end portion 156. More particularly, the structural adapter 162 has the at least one compatible dimensional characteristic 166, referenced in the preceding paragraph, for mating engagement in fixed relationship with top end portion 156 having the at least one dimensional characteristic 158. As described in the preceding paragraph, in the specific embodiment shown in FIG. 1, the at least one compatible dimensional characteristic 166 is the structural adapter 162 having an interior wall 236 having the compatible tapering inside diameter sized for mating engagement with the compatible tapering outside diameter of top end portion 156. When engaged with the top end portion 156 the structural adapter 162 is supported by the top end portion 156 in spaced relation to the ground 110. It will be understood by those of ordinary skill that, according to embodiments, structural adapter 162 can be configured to be installed on the concrete pole 128 after casting of the same, or can be installed on the concrete pole 128 prior to or during casting of the same. In the specific embodiment illustrated in FIG. 1, structural adapter 162 is configured to be installed on concrete pole 128 be being seated by gravity on the top end portion 156 and in fixed, mating engagement therewith. In the embodiment illustrated in FIG. 1, the structural adapter 162 is joined in fixed integral relation with a cable support structure 186 to support the same in fixed structural relationship relative to the top end portion 156 of concrete pole 128. More particularly, in the specific embodiment illustrated in FIG. 3, structural adapter 162 is joined in combination with the cable support structure 186 in permanent fixed integral relation therewith prior to installation of the structural adapter 162 on the concrete pole 128. It will be understood that structural adapter 162 can be joined with cable support structure 186 in any suitable manner such as by, for example, at least one of the following suitable fasteners: weld seams, threaded bolt and nut fastener combinations, rivets, press fit relationships, gravity fit relationships, tongue and groove fastener elements, and other suitable fastening relationships or fasteners. In the specific embodiment illustrated in FIG. 1, structural adapter 162 is joined with cable support structure 186 by suitable fasteners including a plurality of suitable threaded bolt and nut fastener assemblies received in and extending through a plurality of mating, aligned apertures defined in respective of the structural adapter 162 and cable support structure 186. More particularly, in the specific embodiment illustrated in FIG. 1, structural adapter 162 is formed of suitable structural material 198 such as, for example, structural steel material 202, having therein a plurality of bolt holes for receiving the same, and cable support structure 186 is formed of suitable structural material such as, for example, structural steel material having therein, respectively, a plurality of aligned, mating bolt holes for receiving therein respective of threaded bolt and nut fastener assemblies which cooperate therewith to join together the same in fixed structural relation. Major wall member 232 of structural adapter 162 includes an outer transition 244. Outer transition 244 is configured for engagement with cable support structure 186 to support the same in a stationary relationship relative to interior wall 236 and, thus, in a stationary position relative to top end portion 156 of concrete pole 128. In the specific embodiment illustrated in FIG. 1, outer transition 244 is joined with cable support structure 186 in fixed stationary relation thereto by suitable fasteners for supporting the same relative to top end portion 156.

Figure 2:
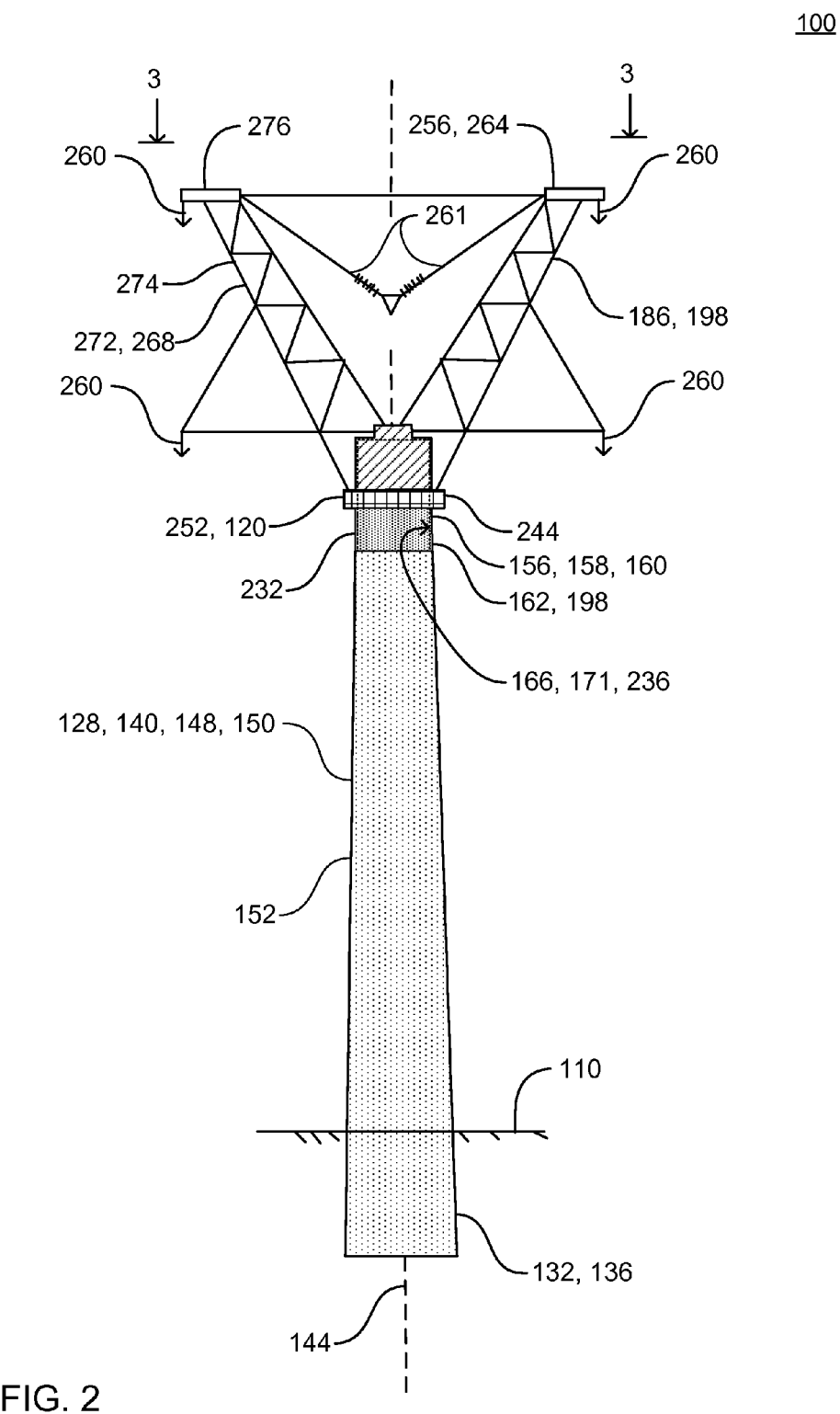
FIG. 2 is an enlarged perspective view of support apparatus for supporting utility cables in a utility transmission line.

Referring to FIG. 1, in the specific embodiment illustrated, support apparatus 120 includes cable support structure 186. Cable support structure 186 is supported in a stationary relationship relative to concrete pole 128 by structural adapter 162. Cable support structure 186 is configured for engagement in fixed structural relationship with structural adapter 162. When engaged with structural adapter 162, the cable support structure 186 is supported by structural adapter 162 in fixed relation to the top end portion 156 of concrete pole 128. Cable support structure 186 includes a base portion 252 proximal the structural adapter 162. The cable support structure 186 at base portion 252 proximal structural adapter 162 is configured for engagement in fixed structural relationship with the structural adapter 162. In the embodiment illustrated in FIG. 1, engagement portion 252 of cable support structure 186 is joined in fixed integral relationship with outer transition portion 244 of structural adapter 162 for the cable support structure 186 to be supported by structural adapter 162 in fixed structural relationship relative to top end portion 156 of concrete pole 128. More particularly, in the specific embodiment illustrated in FIG. 3, cable support structure 186 is joined in combination with structural adapter 162 in fixed integral relation therewith by suitable fasteners 190. In the specific embodiment shown in FIG. 1, cable support structure 186 is joined with structural adapter 162 prior to installation of the structural adapter 162 on the concrete pole 128. One of ordinary skill will understand that a different order of assembly can be used. It will be understood that cable support structure 186 can be joined with structural adapter 162 in any suitable manner such as by, for example, at least one of the following suitable fasteners: weld seams, threaded bolt and nut fastener combinations, rivets, press fit relationships, gravity fit relationships, tongue and groove fastener elements, and other suitable fastening relationships or fasteners. In the specific embodiment illustrated in FIG. 1, cable support structure 186 is joined with structural adapter 162 by suitable fasteners including a plurality of suitable threaded bolt and nut fastener assemblies received in and extending through a plurality of mating, aligned apertures defined in respective of the structural adapter 162 and cable support structure 186. More particularly, as described elsewhere in this disclosure, in the specific embodiment illustrated in FIG. 1 structural adapter 162 is formed of suitable structural material 198 such as, for example, structural steel material, having therein a plurality of bolt holes for receiving the same, and cable support structure 186 is formed of suitable structural material 198 such as, for example, structural steel material having therein, respectively, a plurality of aligned, mating bolt holes for receiving therein respective of threaded bolt and nut fastener assemblies which cooperate therewith to join together the same in fixed structural relation. Cable support structure 186 has a distal portion 256 spaced apart from base portion 252 and structural adapter 162 joined therewith. Distal portion 256 is configured to support at least one utility cable 108 to span therefrom to first and second adjacent supports 124,126. In the specific embodiment shown in FIG. 1, distal portion 256 is configured to support a plurality of utility cables 108. More particularly, in the specific embodiment illustrated in FIG. 1, the plurality of utility cables 108 is five (5) in number. In the embodiment illustrated in FIG. 1, the distal portion 256 is configured to support the plurality of utility cables 108 in spaced relation on respective insulators 260. More particularly, in the specific embodiment illustrated distal portion 256 includes four (4) distal projections 264 each having mounted thereon a respective insulator 260 configured to support a respective utility cable 108 spanning therefrom in spaced, parallel relation to other of the four (4) utility cables 108. In the specific embodiment illustrated, a fifth insulator 260 is suspended from a pair of tension wires 261. One of ordinary skill will understand that the distal projections 264 of distal portion 256 are arranged at respective heights and positions supporting each respective utility cable 108 to span therefrom in a suitable manner. Cable support structure 186 includes an open lattice frame 268 defined by a plurality of intersecting elongated frame members 272. More particularly, the frame members 272 include a plurality of elongated major frame members 274. Frame members 272 include a plurality of elongated minor frame members 276. Minor frame members 276 cross between and intersect the major frame members 274 to join the same and thus form the open lattice frame 268. In the specific embodiment illustrated in FIG. 2, the open lattice frame 268 has a substantially rectangular cross-sectional shape of changing size. The open lattice frame 268 is configured to support the distal portion 256 in fixed relation to the base portion 252 and structural adapter 162 joined therewith. Open lattice frame 268 is configured to extend from engagement portion 252 to a height above top end portion 156. The open lattice frame 268 is configured to support the distal portion 256 at a height above top end portion 156. Distal portion 256 is configured to support a plurality of utility cables 108 to span therefrom. Proximal the structural adapter 162 the base portion 252 of cable support structure 186 is configured to be installed for mating engagement with the outer transition portion 244 of structural adapter 162 in fixed relationship therewith. Base portion 252 when installed in mating engagement with structural adapter 162 is supported by the structural adapter 162 relative to the concrete pole 128. Base portion 252 is configured for engagement in fixed structural relationship with the open lattice frame 268 for supporting the open lattice frame 268 relative to the structural adapter 162. Base portion 252 is joined in permanent fixed integral relation with the open lattice frame 252 by suitable fasteners. In the specific embodiment illustrated in FIG. 1, the fasteners are a plurality of suitable threaded bolt and nut fastener combinations received in respective aligned, mating bolt holes (not shown) in base portion 252 and respective frame members 272 of open lattice frame 268. In an embodiment, suitable fasteners are selected from among the following: weld seams, threaded bolt and nut fastener combinations, rivets, press fit relationships, gravity fit relationships, tongue and groove fastener elements, and other suitable fastening relationships or fasteners. Distal portion 256 is configured to support a plurality of utility cables 180 to span therefrom at heights above the top end portion. In the specific embodiment shown in FIG. 1, cable support structure 186 is substantially symmetrical in relation to a primary vertical plane 288 aligned with the pole central axis 144.

Embodiments provide support apparatus 120 for supporting utility cables 108, and improved utility transmission lines 100 including the same. Embodiments provide support apparatus 120 which includes a cable support structure 186 having open lattice frame 252 supported by a concrete pole 128 above a top end portion 156 thereof Embodiments provide support apparatus 120 which is relatively light weight. Although specific embodiments are illustrated and described herein, it will be appreciated by those of ordinary skill in the art that any arrangement which is calculated to achieve the same purpose can be substituted for the specific embodiments shown. This application is intended to cover any adaptations or variations. For example, although described in terms of the specific embodiments, one of ordinary skill in the art will appreciate that implementations can be made in different embodiments to provide the required function. In particular, one of skill in the art will appreciate that the names and terminology of the apparatus are not intended to limit embodiments. Furthermore, additional apparatus can be added to the components, functions can be rearranged among the components, and new components to correspond to future enhancements and physical devices used in embodiments can be introduced without departing from the scope of embodiments. The terminology used in this application is intended to include all environments and alternatives which provide the same functionality as described herein.

What is claimed is:

1. An apparatus for supporting at least one utility cable for spanning above ground in elevated relation thereto between adjacent supports, the adjacent supports being spaced apart across the ground, the apparatus comprising:
a centrifugally cast prestressed concrete pole, the concrete pole having a bottom end portion to be fixed in the ground, the concrete pole having a top end portion spaced from the bottom end portion, when the bottom end portion is fixed in the ground the top end portion being spaced above the ground in fixed relation thereto,
a structural adapter configured for engagement in fixed structural relationship with the top end portion, when engaged with the top end portion the structural adapter being supported by the top end portion in spaced relation to the ground; and
a plurality of cable support structures configured for engagement in fixed structural relationship with the structural adapter, when engaged with the structural adapter the plurality of cable support structures being supported by the structural adapter in relation to the top end portion, the plurality of cable support structures proximal the structural adapter being configured for engagement in fixed structural relationship with the structural adapter, the plurality of cable support structures having four distal portions spaced apart from the structural adapter, the distal portions configured to support the at least one utility cable to span therefrom, each of the plurality of cable support structures including an open lattice frame defined by a plurality of intersecting elongated frame members, the open lattice frame configured to support the distal portions in fixed relation to the structural adapter,
wherein two distal portions of the four distal portions are on the a portion of the cable support structures, wherein each of the two distal portions on the top portion of the cable support structures include four insulators, each of the four insulators being configured to support the utility cable spanning therefrom in spaced, parallel relation to a second utility cable, wherein an additional insulator is suspended from a pair of tension wires, each of the tension wires being attached to one of the two distal portions on the top portion of the cable support structures.

2. The apparatus for supporting the at least one utility cable as set forth in claim 1 and further comprising:
the structural adapter configured to be installed on the concrete pole after casting of the concrete pole.

3. The apparatus for supporting the at least one utility cable as set forth in claim 1 and further comprising:
the structural adapter configured to be installed in fixed integral relationship with the concrete pole during casting of the concrete pole.

4. The apparatus for supporting the at least one utility cable as set forth in claim 1 and further comprising:
the structural adapter being joined in fixed integral relation with the each of the plurality of cable support structures.

5. The apparatus for supporting the at least one utility cable as set forth in claim 1 and further comprising:
the structural adapter being joined in combination with each of the plurality of cable support structures in permanent fixed integral relation therewith prior to installation of the structural adapter on the concrete pole.

6. The apparatus for supporting the at least one utility cable as set forth in claim 1 and further comprising:
proximal the structural adapter the plurality of cable support structures having a base portion, the base portion configured to be installed in mating engagement with the structural adapter in fixed relationship therewith, the base portion when installed being supported by the structural adapter relative to the concrete pole, the base portion configured for engagement in fixed structural relationship with the open lattice frame for supporting the open lattice frame relative to the structural adapter.

7. The apparatus for supporting the at least one utility cable as set forth in claim 6 and further comprising:
the base portion being joined in permanent fixed integral relation with the open lattice frame.

8. The apparatus for supporting the at least one utility cable as set forth in claim 1 and further comprising:
the structural adapter having a polygonal cross-sectional shape; and
the top end portion having a polygonal cross-sectional shape configured for mating engagement with the structural adapter.

9. The apparatus for supporting the at least one utility cable as set forth in claim 1 and further comprising:
at least one of the structural adapter and the top end portion including a force distribution member configured to distribute relative to the top end portion forces that are exerted on the top end portion by the structural adapter.

10. The apparatus for supporting the at least one utility cable as set forth in claim 1 and further comprising:
each of the plurality of cable support structures being substantially symmetrical in relation to a primary vertical plane bisecting the plurality of cable support structures, the primary vertical plane being substantially aligned with a pole central axis of the concrete pole.

11. The apparatus for supporting the at least one utility cable as set forth in claim 1 and further comprising:
the concrete pole having a pole central axis extending in a longitudinal direction from the bottom end portion to the top end portion, the concrete pole having a substantially continuous outer surface spaced outwardly in a radial direction from the pole central axis, the pole central axis being substantially equidistant from points oppositely located on the outer surface, at the top end portion the outer surface having a dimensional characteristic varying to accommodate the structural adapter.

12. The apparatus for supporting the at least one utility cable as set forth in claim 1 and further comprising:
the top end portion having an outer surface that has a continuous shoulder defined therein, the shoulder extending about a periphery of the outer surface, the shoulder being configured for abutting relationship with the structural adapter to provide support preventing downward movement of the structural adapter relative to the outer surface.

13. An apparatus for supporting a plurality of utility cables for spanning above ground in elevated relation thereto between adjacent supports, the adjacent supports being spaced apart across the ground, the apparatus comprising:
a centrifugally cast prestressed concrete pole, the concrete pole having a bottom end portion to be fixed in the ground, the concrete pole having a top end portion spaced from the bottom end portion, when the bottom end portion is fixed in the ground the top end portion being spaced above the ground in fixed relation thereto,
a structural adapter configured for engagement in fixed structural relationship with the top end portion, when engaged with the top end portion the structural adapter being supported by the top end portion in spaced relation to the ground; and
a plurality of cable support structures configured for engagement in fixed structural relationship with the structural adapter, when engaged with the structural adapter the plurality of cable support structures being supported by the structural adapter in relation to the top end portion, the plurality of cable support structures being proximal to the structural adapter and being configured for engagement in fixed structural relationship with the structural adapter, the plurality of cable support structures having four distal portions spaced apart from the structural adapter, the distal portions configured to support the plurality of utility cables to span therefrom in substantially parallel relation, each of the plurality of cable support structures including an open lattice frame defined by a plurality of intersecting elongated frame members, the open lattice frame configured to extend above the top end portion, the open lattice frame configured to support the distal portion in fixed relation to the structural adapter above the top end portion, the distal portion configured to support above the top end portion the plurality of utility cables to span therefrom, each of the plurality of utility cables being supported in substantially parallel spaced relation to other of the plurality of utility cables,
wherein two distal portions of the four distal portions are on the a portion of the cable support structures, wherein each of the two distal portions on the top portion of the cable support structures include four insulators, each of the four insulators being configured to support the utility cable spanning therefrom in spaced, parallel relation to a second utility cable,
wherein an additional insulator is suspended from a pair of tension wires, each of the tension wires being attached to one of the two distal portions on the top portion of the cable support structures.

14. The apparatus for supporting the plurality of utility cables as set forth in claim 13 and further comprising:
the plurality of cable support structures being substantially symmetrical in relation to a primary vertical plane bisecting the plurality of cable support structures, the primary vertical plane being substantially aligned with a pole central axis of the concrete pole.

15. The apparatus for supporting the plurality of utility cables as set forth in claim 13 and further comprising:
the concrete pole having a pole central axis extending in a longitudinal direction from the bottom end portion to the top end portion, the concrete pole having a substantially continuous outer surface spaced outwardly in a radial direction from the pole central axis, the pole central axis being substantially equidistant from points oppositely located on the outer surface, at the top end portion the outer surface having a dimensional characteristic varying to accommodate the structural adapter.

16. The apparatus for supporting the plurality of utility cables as set forth in claim 13 and further comprising:
the structural adapter having a polygonal cross-sectional shape; and
the top end portion having a polygonal cross-sectional shape configured for mating engagement with the structural adapter.

17. The apparatus for supporting the plurality of utility cables as set forth in claim 13 and further comprising:
the top end portion having an outer surface that has a continuous shoulder defined therein, the shoulder extending about a periphery of the outer surface, the shoulder being configured for abutting relationship with the structural adapter to provide support preventing downward movement of the structural adapter relative to the outer surface.

18. A plurality of cable support structures for supporting a plurality of utility cables for spanning above ground in elevated relation thereto between adjacent supports, the adjacent supports being spaced apart across the ground, said plurality of cable support structures configured for engagement in fixed structural relationship with a structural adapter, the structural adapter configured for engagement in fixed structural relationship with a centrifugally cast prestressed concrete pole at a top end portion thereof, when engaged with the top end portion the structural adapter being supported by the top end portion in spaced relation to the ground, each of the plurality of cable support structures comprising:
a proximal portion configured for engagement in fixed structural relationship with the structural adapter, when the proximal portion is engaged with the structural adapter the plurality of cable support structures being supported by the structural adapter in relation to the top end portion;
four distal portions spaced apart from the structural adapter, the distal portions configured to support above the top end portion the plurality of utility cables to span therefrom in substantially parallel relation; and
an open lattice frame defined by a plurality of intersecting elongated frame members, the open lattice frame configured to extend from the proximal portion to above the top end portion, the open lattice frame configured to support the distal portions above the top end portion in fixed relation to the structural adapter,
wherein two distal portions of the four distal portions are on the a portion of the cable support structures, wherein each of the two distal portions on the top portion of the cable support structures include four insulators, each of the four insulators being configured to support the utility cable spanning therefrom in spaced, parallel relation to a second utility cable,
wherein an additional insulator is suspended from a pair of tension wires, each of the tension wires being attached to one of the two distal portions on the top portion of the cable support structures.

19. The cable support structure as set forth in claim 18 and further comprising:
the plurality of cable support structures being substantially symmetrical in relation to a primary vertical plane bisecting the plurality of cable support structures, the primary vertical plane being substantially aligned with a pole central axis of the concrete pole.

20. A utility transmission line configured to carry utility service along a route, the utility transmission line including at least one utility cable spanning between a series of supports spaced apart along the route, the utility transmission line comprising:
an apparatus for supporting the at least one utility cable to span between adjacent of the supports, the apparatus comprising:
a centrifugally cast prestressed concrete pole, the concrete pole having a bottom end portion to be fixed in the ground, the concrete pole having a top end portion spaced from the bottom end portion, when the bottom end portion is fixed in the ground the top end portion being spaced above the ground in fixed relation thereto,
a structural adapter configured for engagement in fixed structural relationship with the top end portion, when engaged with the top end portion the structural adapter being supported by the top end portion in spaced relation to the ground; and
a plurality of cable support structures configured for engagement in fixed structural relationship with the structural adapter, when engaged with the structural adapter the plurality of cable support structures being supported by the structural adapter in relation to the top end portion, the plurality of cable support structures proximal the structural adapter being configured for engagement in fixed structural relationship with the structural adapter, the plurality of cable support structures having four distal portions spaced apart from the structural adapter, the distal portions configured to support the at least one utility cable to span therefrom, the plurality of cable support structures including an open lattice frame defined by a plurality of intersecting elongated frame members, the open lattice frame configured to support the distal portion in fixed relation to the structural adapter,
wherein two distal portions of the four distal portions are on the a portion of the cable support structures, wherein each of the two distal portions on the top portion of the cable support structures include four insulators, each of the four insulators being configured to support the utility cable spanning therefrom in spaced, parallel relation to a second utility cable,
wherein an additional insulator is suspended from a pair of tension wires, each of the tension wires being attached to one of the two distal portions on the top portion of the cable support structures.

21. The utility transmission line as set forth in claim 20, and further comprising:
the open frame lattice configured to extend above the top end portion, the open frame lattice configured to support the distal portion above the top end portion, the distal portion configured to support the at least one utility cable above the top end portion.

\* \* \* \* \*